United States Patent
Yeomans

(10) Patent No.: US 6,406,155 B1
(45) Date of Patent: Jun. 18, 2002

(54) PARABOLIC REFLECTORS

(76) Inventor: Allan James Yeomans, 60 Sunrise Boulevard, Surfers Paradise, QLD 4217 (AU)

( * ) Notice: Subject to any disclaimer, the term of this patent is extended or adjusted under 35 U.S.C. 154(b) by 0 days.

(21) Appl. No.: 09/850,175

(22) Filed: May 7, 2001

(51) Int. Cl.[7] .................................................. G02B 5/10
(52) U.S. Cl. ........................ 359/853; 359/850; 359/851; 359/852
(58) Field of Search ................................ 359/853, 850, 359/851, 852, 366, 868, 847, 618; 126/600, 578, 686; 156/163

(56) References Cited

U.S. PATENT DOCUMENTS 4,764,779 A * 8/1988 Sato et al. .................. 343/897
5,430,571 A * 7/1995 Witteven .................... 359/216
5,455,706 A * 10/1995 Brotz ......................... 359/198

FOREIGN PATENT DOCUMENTS

FR 2657966 8/1991
GB 1563700 3/1980

* cited by examiner

Primary Examiner—Mohammad Sikder
(74) Attorney, Agent, or Firm—Wood, Phillips, Katz, Clark & Mortimer

(57) ABSTRACT

A parabolic reflector assembly (10) comprising a base member (11) formed of magnetic material and defining a parabolic surface (12), and a flexible magnet sheet (18) carrying a reflective sheet (19) magnetically bonded to the parabolic surface to form a parabolic reflecting surface. A method of manufacturing the parabolic reflector assembly is also disclosed. The parabolic reflect or assembly typically may be used as a concentrator is solar energy concentrating apparatus.

14 Claims, 3 Drawing Sheets

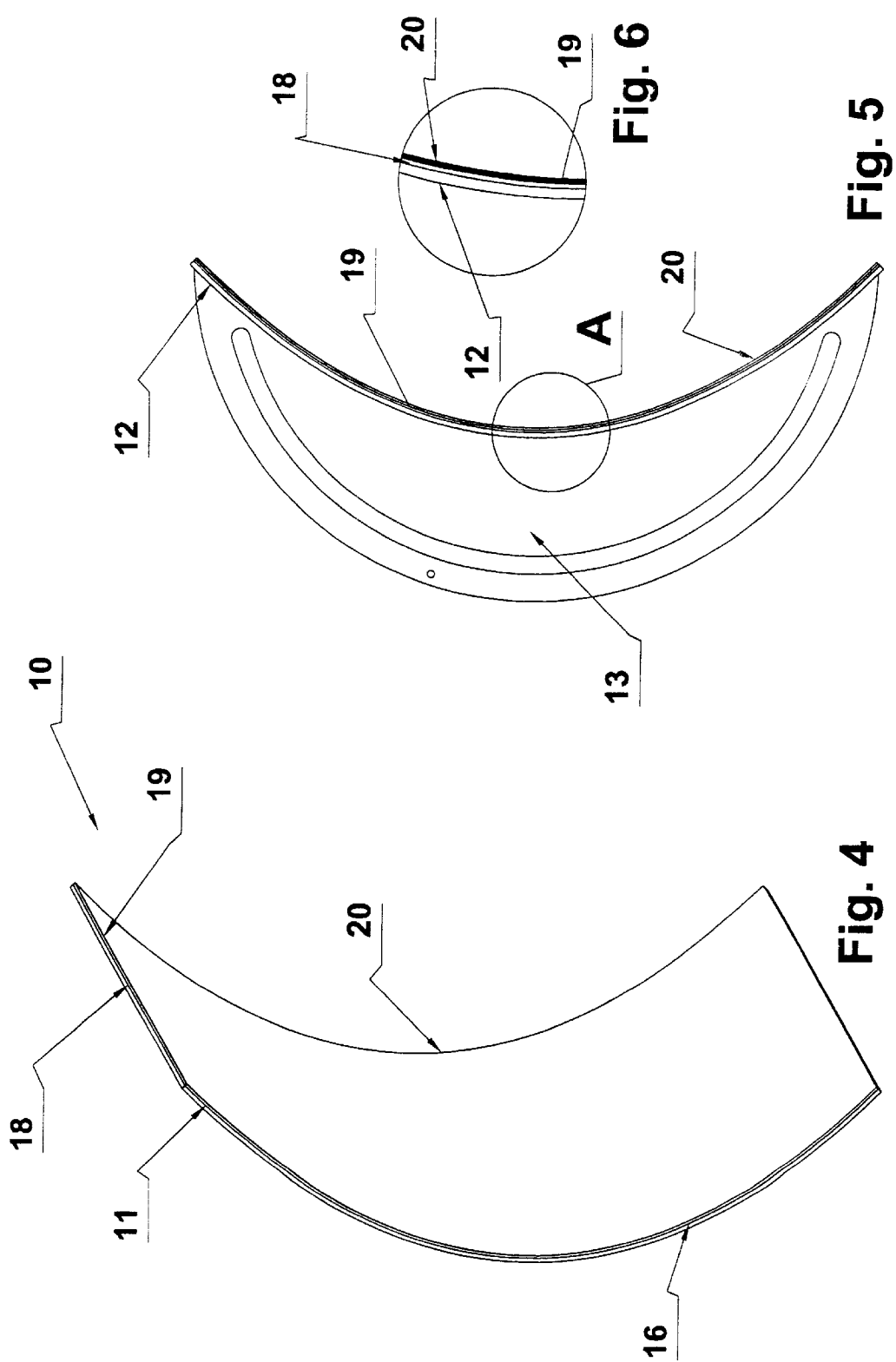

PARABOLIC REFLECTORS

TECHNICAL FIELD

This invention relates to parabolic reflectors which may be used as solar energy concentrators in solar energy collecting apparatus but which also may be used in other applications. The present invention also relates to a method of manufacturing parabolic reflectors.

BACKGROUND ART

In solar energy collecting apparatus, parabolic reflectors are commonly used for concentrating solar energy on solar energy absorbers. The reflectors which are used are formed of various materials. For example, the reflectors may comprise metal such as aluminium which is highly polished to define a reflecting surface, or glass mirrors. It is important in solar energy collecting apparatus used in the generation of electrical power that the costs of the apparatus be such that the unit power generating costs are competitive with that of conventional power generation systems. The known reflectors used in solar energy collecting apparatus however are generally relatively expensive to manufacture resulting in increased overall costs of the solar energy collecting apparatus. Further if the reflective surfaces of the reflectors become damaged, the whole reflectors are usually required to be replaced which is also costly. Further costs can arise because of loss of power generating capacity in down time in replacing the reflectors.

SUMMARY OF THE INVENTION

The present invention aims to provide a parabolic reflector which is relatively inexpensive, which may be easily constructed and which may be easily and rapidly replaced in the event of damage thereto. The present invention further aims to provide a method of manufacturing a parabolic reflector of the above type. The present invention further aims to provide solar energy concentrating apparatus employing parabolic reflectors of the above type. Other objects and advantages of the invention will become apparent from the following description.

The present invention thus provides in a first aspect, a parabolic reflector assembly comprising:

- a base member formed of a magnetic material and defining a parabolic surface,
- at least one flexible magnet sheet having an inner side and an outer side, said flexible magnet sheet being magnetically bonded to said base member with said inner side of said magnet sheet being adjacent said parabolic surface such that said magnet sheet adopts the parabolic shape of said parabolic surface, and
- a reflective material on said outer side of said magnet sheet and defining a parabolic reflective surface.

The reflective material may be in the form of or be carried by a flexible sheet such as a plastics sheet which may be bonded or adhered to the outer side of the magnet sheet. The adherence between the magnet sheet and sheet of reflective material may be defined by self-adhesive layer on the outer side of the magnet sheet, on one side of the reflective material sheet or both.

The reflective material sheet may be formed as a laminate of sheet plastics material and a reflective film such as a silver film or aluminium film. A particularly suitable material is that manufactured by the 3M company and sold under the trademark Silverlux silver film.

As an alternative, the reflective material may be defined by a layer deposited on or otherwise applied to the outer side of the magnet sheet.

The flexible magnet sheet may be any form of flexible permanent magnet and comprise for example a flexible plastic material such as a thermoplastic material which incorporates a magnetic powder or magnetic granules and which is known under the trademark Tromaflex.

The base member for the formation of a parabolic reflector assembly which is of a parabolic trough form may comprise a panel of magnetic sheet metal formed into a parabolic shape to define a parabolic trough surface to receive the magnet sheet which through magnetic attraction to the metal sheet conforms closely to the parabolic trough surface to form a parabolic trough reflector. Suitably the panel of sheet metal is pressed and held against a parabolic formed to form the base member with the parabolic surface. The panel may be secured to the former for example by welding. The base member however may also comprise a parabolic dish member defining a parabolic dish surface to which a plurality of flexible magnet sheets carrying reflective layers or materials may be magnetically bonded to form a parabolic dish reflector assembly.

A layer of a highly heat conducting material may be interposed between the reflective material and magnet sheet. Suitably, the heat conducting material is aluminium or other high heat conducting metal. The highly heat conducting material is used to dissipate heat generated in the reflector. In parabolic reflectors of the above type, the optical concentrators can have imperfect concentrating surfaces which can result in localised areas of high concentration of solar energy and thus areas of high temperature. This can cause damage to the components of the parabolic reflector, particularly the magnet sheet. The use of a highly heat conducting material interposed between the reflective material and magnet sheet dissipates the heat and conducts it more readily through to the parabolic base member. In addition, the highly heat conducting material adds some stiffness to the reflective material/magnet sheet combination such that a more accurate parabolic surface results when the combination is applied to parabolic base members having imperfect parabolic surfaces, for example a galvanised sheet metal base member which may define an imperfect surface due to the galvanising process causing uneven deposits on the surface.

The present invention in a further aspect provides a method of manufacturing a parabolic reflector assembly, said method comprising the steps of:

- providing a base member formed of magnetic material, said base member having a parabolic surface,
- providing at least one flexible magnet sheet, said magnet sheet having an inner side and an outer side,
- providing a reflective material on the outer side of said magnet sheet; and
- applying said flexible magnet sheet to said parabolic surface such that said flexible magnet sheet is magnetically bonded to said base member with said inner side of said magnet sheet being adjacent said parabolic surface whereby to cause said reflective material to define a parabolic reflective surface.

The method may include the further step of providing a highly heat conductive material between the magnet sheet and the reflective material.

The method may additionally include the step of forming the base member from a panel of sheet magnetic metal. The panel of sheet magnetic metal may be formed into a parabolic shape by pressing it against a parabolic former and securing it to the former. The panel may be secured to the former by welding.

The present invention in yet a further aspect provides a solar energy collecting apparatus including a solar energy concentrator for concentrating solar energy on a target wherein the solar energy concentrator comprises a parabolic reflector assembly of the above described type.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 4 is a perspective view of the assembled parabolic reflector assembly according to the invention;

FIG. 5 is a side view of the assembled parabolic reflector assembly; and

FIG. 6 is an enlarged view of the region A of FIG. 6.

DETAILED DESCRIPTION OF THE PREFERRED EMBODIMENT

Figure 1:
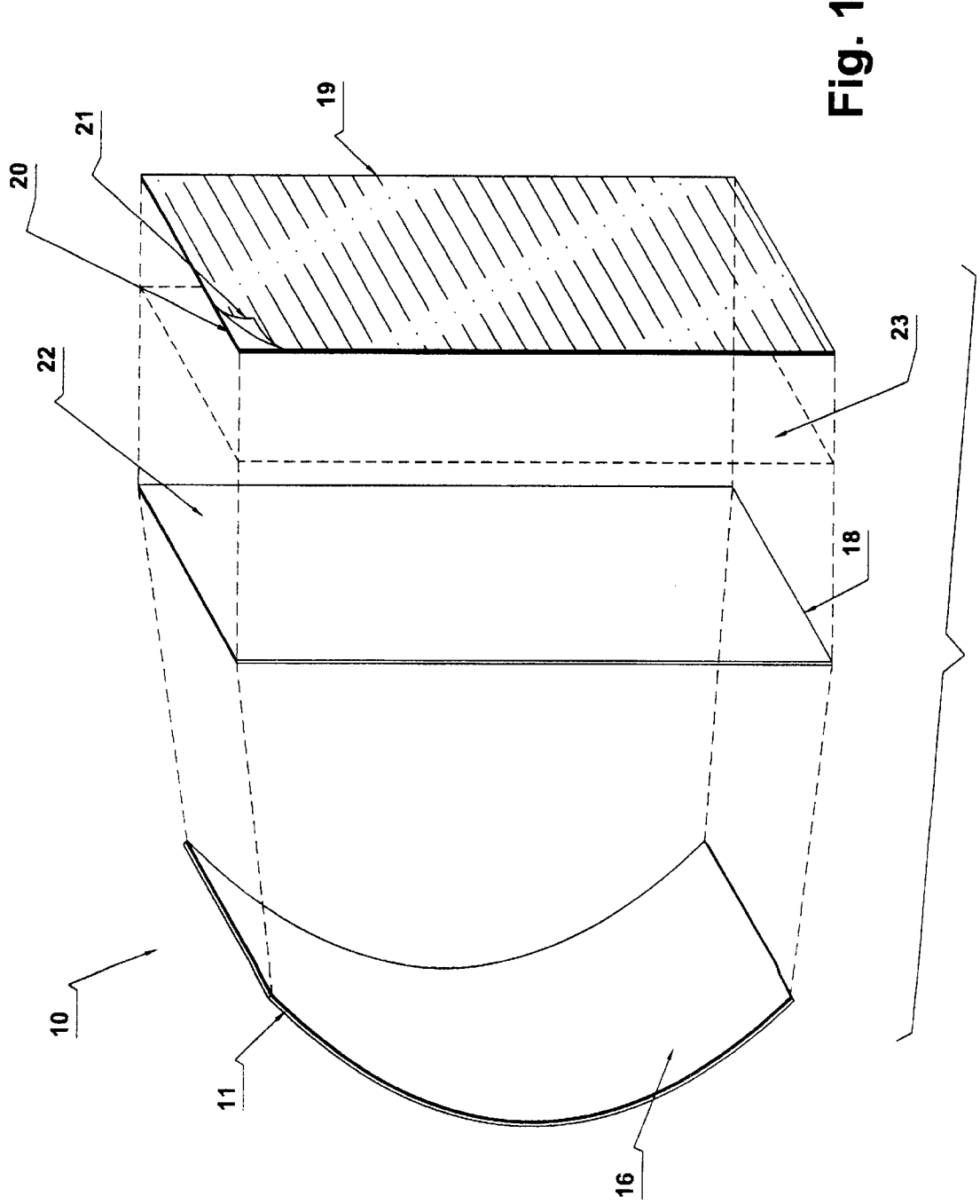
FIG. 1 illustrates in exploded view the components of the parabolic reflector assembly according to an embodiment of the invention prior to assembly.

Referring to the drawings and firstly to FIG. 1, there is illustrated the components of a parabolic reflector assembly 10 according to an embodiment of the invention comprising a parabolic base member 11 formed by a metal sheet of magnetic material, typically sheet steel. Where the parabolic reflector assembly 10 is to be used externally as in solar energy collecting apparatus, the parabolic base member 11 may be formed of galvanised sheet metal to reduce corrosion.

Figure 2:
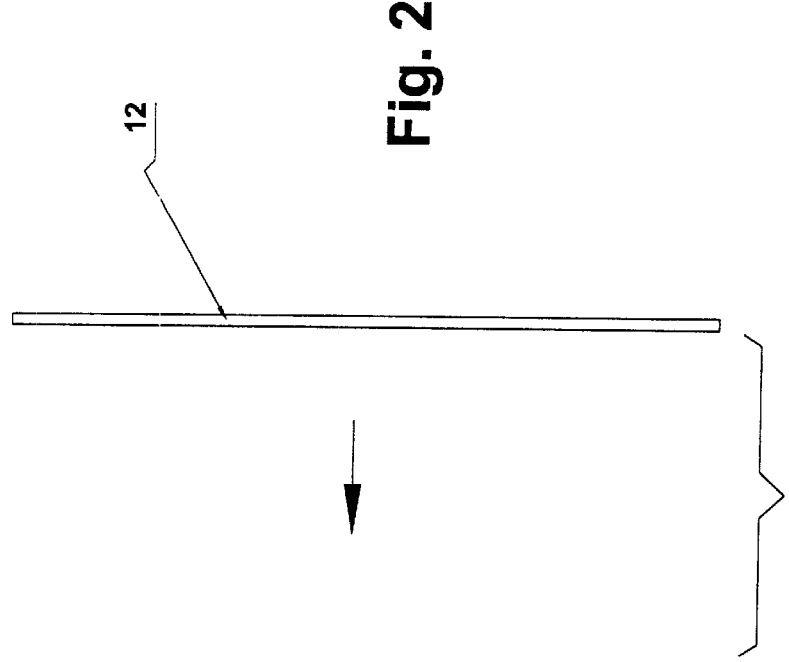
FIG. 2 illustrates the manner in which a metal sheet may be formed into a parabolic trough shape to form the base member for the reflector assembly.
Figure 3:
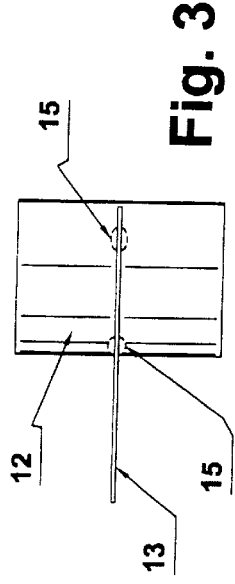
FIG. 3 is a plan view of the formed parabolic base member.

A rectangular panel of sheet metal may be formed into a parabolic trough shape in the manner shown in FIGS. 2 and 3 to form the base member 11. As illustrated, a planar panel 12 of thin sheet metal may be arranged centrally of a supporting metal rib or fin 13 which has an edge 14 accurately cut to a parabolic form. The edge 14 typically may be laser cut to achieve the required accuracy. The panel 12, when urged in the direction of the arrow of FIG. 2 into position against the rib or fin 12, will, as shown in dotted outline in FIG. 2, deform and adopt the parabolic shape of the edge 14 of the rib or fin 13. The panel 12 may be simply held in position by tack welds 15 at spaced positions on either side of the rib or fin 13 such that the panel 12 defines an accurate parabolic surface 16. The fin or rib 13 may as illustrated be provided with a curved slot 17 for the purposes of mounting and guiding of the formed parabolic reflector assembly 10 to track movement of the sun as described in my U.S. Pat. No. 5,592,932, the contents of which are herein incorporated by reference. Whilst the above described arrangement illustrates one method for forming a parabolic base member 11, it will be appreciated that the parabolic base member 11 may be formed by many different methods such as by pressing the sheet 12 into the required parabolic shape.

The reflector assembly 10 further includes a rectangular flexible magnet sheet 18 which is usually formed of a flexible plastic such as thermoplastics incorporating a magnetised powder or granules. The magnet sheet 18 preferably has a length and width substantially the same as that of the panel 12 which forms the parabolic base member 11 so as to substantially occupy the full parabolic surface 16 when applied to the base member 11 as described further below.

The reflective surface of the parabolic reflector assembly 10 is defined by a laminate of a rectangular flexible sheet 19 formed of plastics material and incorporating a layer or film 20 of silver or other highly reflective material, the sheet 19 being of a size and shape to match the magnet sheet 18. A particular suitable laminate for this purpose comprises a product known under the trade mark Silverlux manufactured by the 3M company which incorporates a silver film. The reflective layer or film 20 may be covered with a plastic protective sheet 21 which may be removed after formation of the reflector assembly 10 to expose the reflective layer or film 20.

Most suitably, the flexible magnet sheet 18 has, or is provided with, on one side 21, a self-adhesive material or layer which enables the reflective sheet 19 to be conveniently adhered to the magnet sheet 18. Alternatively, the reflective sheet 19 may include on its reverse side, that is, its side opposite the layer or film 20, a self-adhesive layer or material to permit it to be adhered to the flexible magnet sheet 18. In yet an alternative arrangement, a separate adhesive may be provided to adhere the reflective sheet 19 to the flexible magnet sheet 18.

After joining of the reflective sheet 19 to the flexible magnet sheet 18, the joined sheets 18 and 19 are applied to the parabolic base member 11 to form the parabolic reflector assembly 10 shown in FIGS. 4 to 6. This may simply be achieved by positioning the joined sheets 18 and 19 in alignment with the parabolic base member 11 and pushing the sheets 18 and 19 inwardly towards the base member 11. The flexible magnet sheet 18 will be magnetically attracted to the magnetic parabolic base member 11 and seat firmly on the surface 16 to thereby form the reflective sheet 19 and surface 20 into a true parabolic shape defined by the base member 11. The face-to-face mating between the inner side of the magnet sheet 18, that is the side opposite the side 12, and the parabolic surface 16 will ensure that the magnet sheet 18 carrying the reflective sheet 19 is securely held in position to resist detachment in the event of high winds, rain or other adverse weather conditions. If however, the reflective sheet 19 or reflective layer 20 becomes damaged, the magnet sheet 18 may be simply detached from the parabolic base member 11 and replaced by a new assembly of magnet sheet 18 and reflective sheet 19.

In a modification, a further sheet 23 of flexible highly heat conducting material (shown in dotted outline in FIG. 1) of similar peripheral dimensions to the sheets 18 and 19 may be interposed between the reflective sheet 19 and magnet sheet 18 and adhered thereto. The sheet 23 which typically may be of 0.5mm in thickness but which may be of other thicknesses will provide some stiffness to the assembly of reflective sheet 19 and magnet sheet 18 and further serve to dissipate heat and conduct it to the parabolic base member 11. Thus heat which is developed in localised areas of the reflector assembly 10 due to imperfect optical characteristics of the reflective sheet 19 will be dissipated and conveyed rapidly by the heat conducting sheet 23 to the underlying parabolic base 11 to minimise the possibility of damage to the reflective sheet 19 and/or magnet sheet 18. Further the additional stiffness in the assembly will ensure that any imperfections in the parabolic surface 16 of the base member 11 will have minimal effect on the parabolic reflecting characteristics of the reflector assembly 10.

The sheet 23 may be adhered on opposite sides to the magnet sheet 18 and the reflective sheet 19 by any suitable adhesives or alternatively via self adhesive layers on the magnet sheet 18 and/or reflective sheet 19. Alternatively, the reflective sheet 19 may be provided with the heat conducting sheet 23 adhered thereto in a composite laminate.

The present invention thus provides an arrangement whereby a parabolic trough reflector may be manufactured accurately, quickly and inexpensively and which allows rapid repair in the case of damage to the reflective surface. Parabolic reflectors according to the present invention can be used in many different applications but typically are used in solar energy concentrating applications where solar energy is concentrated by the parabolic reflector onto a target. Thus in the embodiment of FIGS. 4 and 5, the parabolic reflector assembly 10 may be used in solar energy collecting apparatus as a parabolic concentrator with the formed parabolic reflective surface 20 concentrating energy on a suitable target for example a tubular member carrying an energy transfer medium which is arranged at the focus of the parabolic reflector assembly. Such apparatus is defined in my aforesaid U.S. Pat. No. 5,592,932.

The embodiment described relates to a parabolic trough reflector of a particular shape and configuration however it will be appreciated that the parabolic trough reflector may be of any shape desired with the magnet sheet 18 and reflective sheet 19 simply cut or provided in a size to fit the parabolic trough surface. Of course, the parabolic trough surface may carry a plurality of magnet sheets 18 carrying reflective sheets 19 sufficient to cover the parabolic trough surface 16 or cover the surface 16 to the extent required. For example the trough surface 16 may be covered in a pair of end-to-end abutting sheets 18 carrying reflective sheets 19, the join between abutting sheets 18 being arranged centrally of and extending transversely of the base member 11.

It also should be appreciated that the invention may be applied to the formation of a parabolic dish reflector or concentrator in which case a plurality of magnet sheets 18 carrying the reflective sheets 19 may be magnetically bonded to the parabolic dish surface in abutting end-to-end or side-to-side relationship to form a composite parabolic reflecting dish concentrator.

Whilst the above has been given by way of illustrative embodiment of the invention, all such variations and modifications thereto as would be apparent to persons skilled in the art are deemed to fall within the broad scope and ambit of the invention as defined in the appended claims.

I claim:

1. A parabolic reflector assembly comprising:
   a base member formed of a magnetic material and defining a parabolic surface,
   at least one flexible magnet sheet having an inner side and an outer side, said flexible magnet sheet being magnetically bonded to said base member with said inner side of said magnet sheet being adjacent said parabolic surface such that said magnet sheet adopts the parabolic shape of said parabolic surface, and
   a reflective material on said outer side of said magnet sheet and defining a parabolic reflective surface.

2. A parabolic reflector assembly as claimed in claim 1 wherein said reflective material is bonded to said outer side of said magnet sheet.

3. A parabolic reflector assembly as claimed in claim 2 wherein said reflective material is in the form of or is carried by a flexible sheet.

4. A parabolic reflector assembly as claimed in claim 3 wherein said reflective material comprises a laminate of a sheet plastics material and a reflective film.

5. A parabolic reflector assembly as claimed in claim 3 wherein said magnet sheet includes on its outer side a self adhesive material for bonding of said reflective material sheet to said magnet sheet.

6. A parabolic reflector assembly as claimed in claim 1 wherein said base member is formed of a sheet of magnetic material.

7. A parabolic reflector assembly as claimed in claim 6 and including a parabolic former and wherein said sheet of magnetic material is held against said parabolic former to form said base member with said parabolic surface.

8. A parabolic reflector assembly as claimed in claim 1 and including a layer of flexible highly heat conductive material between said reflective material and said magnet sheet.

9. A parabolic reflector assembly as claimed in claim 8 wherein said heat conductive material comprises aluminium sheet.

10. A method of manufacturing a parabolic reflector assembly, said method including the steps of:
    providing a base member formed of magnetic material, said base member having a parabolic surface,
    providing at least one flexible magnet sheet, said magnet sheet having an inner side and an outer side,
    providing a reflective material on the outer side of said magnet sheet; and
    applying said flexible magnet sheet to said parabolic surface such that said flexible magnet sheet is magnetically bonded to said base member with said inner side of said magnet sheet adjacent to said parabolic surface whereby to cause said reflective material to define a parabolic reflective surface.

11. A method as claimed in claim 10 and including the step of forming said base member from a panel of sheet magnetic metal.

12. A method as claimed in claim 11 wherein said base member is formed by the steps of pressing said panel of sheet magnetic metal against a parabolic former and securing said panel to said former.

13. A method as claimed in claim 12 and including the step of providing a layer of highly heat conductive material between said reflective material and said magnet sheet.

14. Solar energy collecting apparatus including a solar energy concentrator for concentrating solar energy on a target wherein said solar energy concentrator comprises a parabolic reflector assembly of the type claimed in claim 1.

* * * * *